Figure 1:
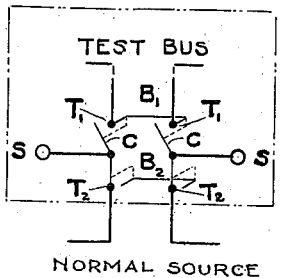

B. G. JAMIESON.
ELECTRICAL MEASURING INSTALLATION.
APPLICATION FILED FEB. 14, 1908.

989,711.

Patented Apr. 18, 1911.

2 SHEETS—SHEET 1.

WITNESSES
Albert E. Bell
George E. Higham.

INVENTOR
Bertrand G. Jamieson
BY Brown & Williams
ATTORNEYS

B. G. JAMIESON.
ELECTRICAL MEASURING INSTALLATION.
APPLICATION FILED FEB. 14, 1908.

989,711.

Patented Apr. 18, 1911.

2 SHEETS—SHEET 2.

UNITED STATES PATENT OFFICE.

BERTRAND G. JAMIESON, OF CHICAGO, ILLINOIS.

ELECTRICAL MEASURING INSTALLATION.

989,711.  Specification of Letters Patent.  Patented Apr. 18, 1911.

Application filed February 14, 1908. Serial No. 415,974.

*To all whom it may concern:*

Be it known that I, BERTRAND G. JAMIESON, a citizen of the United States, residing at Chicago, in the county of Cook and State of Illinois, have invented a certain new and useful Improvement in Electrical Measuring Installations, of which the following is a full, clear, concise, and exact description, reference being had to the accompanying drawings, forming a part of this specification.

My invention relates to electrical measuring installations and has particular reference to the means employed for testing, correcting or calibrating electrical measuring instruments such as ammeters, voltmeters and wattmeters, when permanently mounted upon switchboards in power or other electrical installations.

It is well known to those skilled in the art that the various electrical instruments which are mounted upon the switchboard panels in a power station are subject to variations and changes which necessitate the readjustment or calibration of the instruments in order that their indications may be correct. It is the practice in the best plants to make periodic tests of all of the instruments upon the various switchboards. These tests may be made, for example, by connecting the service instruments with a source of special testing current and apparatus whereby the service instrument may be compared with a standard instrument of known accuracy. In order to make such tests it is generally necessary that the service instrument be disconnected from service wiring and source of current and that it be connected with the test source and test instruments. It is, of course, desirable also that the instrument be tested without removing it from its position in the switchboard. The result is that the switchboard attendants are required to disconnect the instrument from the normal source and connect it in a temporary manner with the test source and instruments. This work must very often be done under very hazardous conditions on account of the high tension conductors which are at the back of the switchboard panels where the work of making the proper connections for testing purposes must be carried on. Furthermore, it is frequently difficult to gain access to the terminals of the instruments for making the required connections. All of these difficulties have combined to deter the superintendents of power plants from testing and correcting the instruments as frequently as might be desirable. Furthermore, the testing of instruments under these conditions has been very expensive on account of the large amount of time and the great care which are required in making the connections and reëstablishing the proper service connections after the testing has been completed.

In accordance with my invention, I have provided means permanently associated with each of the instruments of a switchboard, whereby the regular switchboard attendant may almost instantaneously transfer any instrument to a source of test current with which suitable standard instruments are associated.

In the preferred form of my invention the adapter which is associated with each instrument takes the form of a switch mounted upon or near the instrument itself, this switch being so arranged that when in one of its alternative positions it connects the instrument with the service circuits, while in the other position it connects the instrument with the circuit leading to the test instruments and source. In transferring an ammeter from the service circuit to the special testing circuit it is necessary to short-circuit the service conductors which lead to and from the ammeter before the ammeter is removed from the service circuit to be connected in the testing circuit. My invention provides means whereby this necessary switching may be accomplished from the face of the board in a very simple and effective manner.

In accordance with my invention, furthermore, I provide a permanent auxiliary wiring which is utilized solely for testing purposes. This auxiliary wiring runs from the source of testing current and the standard instruments with which comparisons are made to all of the instruments in the switchboard. All of the instruments are normally disconnected from this auxiliary test wiring, however, and it is only when the adapter associated with any instrument is thrown into its testing position that the instrument is connected with the testing source and instruments by means of the auxiliary wiring. The adapters of my invention are, where necessary, provided with switching contacts for closing the auxiliary testing circuit at those points at which the instruments are not connected with the auxiliary circuit.

All of these and the other features of my invention will be more readily understood by reference to the accompanying drawings, in which—

Figure 2:
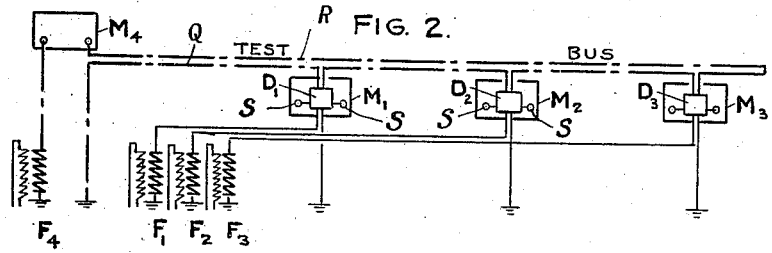
Figure 3:
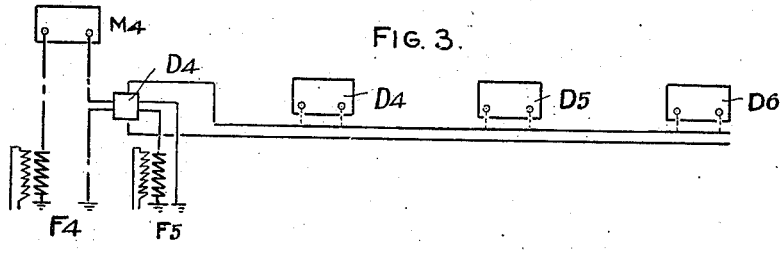
Figure 4:
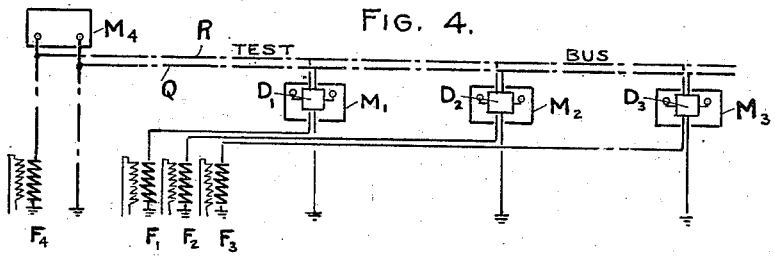
Figure 5:
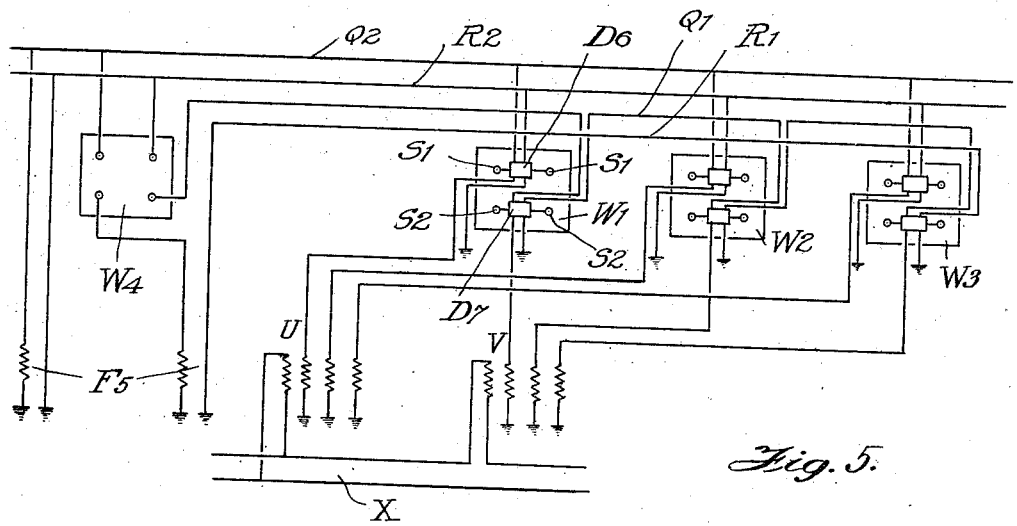

Figure 1 illustrates diagrammatically one way in which the adapter may be arranged to carry out my invention; Fig. 2 diagrammatically illustrates the way in which my invention is employed in testing ammeters; Fig. 3 illustrates the use of my invention under conditions in which it is desired to compare a group of instruments and the circuit connecting them together with a test instrument. Fig. 4 diagrammatically illustrates the arrangement employed for testing voltmeters; Fig. 5 diagrammatically illustrates the arrangement used in testing wattmeters; and Fig. 6 illustrates a conventionalized mechanical form in which the adapters may be constructed.

Figure 6:
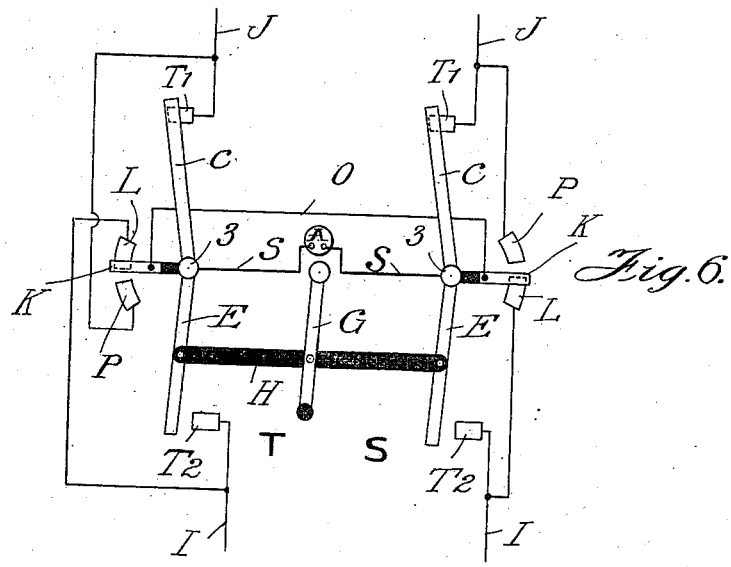

Referring first to Fig. 6, it may be explained that switch blades C, C and E, E are pivotally mounted at 3, 3, and are adapted to be swung from one position to the other by means of the actuating lever G, which is connected with the switch blades by the cross bar H of suitable insulating material. The wires S, S are connected with the terminals of the switchboard instrument and the entire adapter mechanism is preferably mounted upon the base of the instrument. The hard rubber handle at the end of the lever G preferably extends through the face of the switchboard panel so as to be accessible to an operator. The balance of the adapter mechanism is preferably mounted behind the switchboard panel as is the mechanism of the service instruments under ordinary conditions. The contacts $T_2$, $T_2$ are connected by the wires I, I with the service bus bars. The adapter shown in Fig. 6 is intended for application to an ammeter, and it will be seen that when the handle of the lever G is in the right hand position marked S, the current flowing through the service bus bar will pass through one of the wires I and its contact $T_2$ to a switch blade E, thence through the service ammeter by way of the wires S, S and thence through the other switch blade E, a contact $T_2$ and the wire I to the service bus. The contacts $T_1$, $T_1$ form the terminals of the wires J, J, which form a part of the auxiliary test circuit already referred to. When the lever G is thrown into the testing position, as indicated in Fig. 6, the switch blades C, C will make connection with the contacts $T_1$, $T_1$, thereby connecting the service instrument with the test bus by means of the conductors J, J. It will now be apparent that some means must be provided in order to permit the flow of the service current between the wires I, I. This is provided for by means of the switch blades K, K and the associated contacts. As the switch blades are moved from the service to the test position the switch blades K, K make connection with the contacts L, L just before the blades E, E break connection with the contacts $T_2$, $T_2$. The contacts P and L are placed sufficiently close together so that in moving the blade K from one to the other there will be an instant when the switch blade will be in connection with both of these contacts. This arrangement results in having blade K make connection with the contact L before blade E breaks connection with contact $T_2$, and in having blade K make connection with contact P before blade C breaks connection with contact $T_1$. Since the switch blades K, K are connected together by the wire O, a circuit will be provided from one of the conductors I through a contact L, a switch blade K, the wire O, the other switch blade K, a contact L, to the other wire I. This short-circuiting of the normal connections to the instrument will maintain the continuity of the main circuit while the instrument is connected with the test bus. In like manner the contacts P, P coöperate with the switch blades K, K and the wire O to maintain the continuity of the auxiliary test circuit when the switchboard instrument is connected with the service circuit. Fig. 1 diagrammatically illustrates the same circuit connections and the switch mechanism for making the changes in circuit conditions as explained in connection with Fig. 6.

In Fig. 2 I have indicated at $M_1$, $M_2$, $M_3$ a number of switchboard ammeters permanently mounted in position upon the switchboard panels. For purposes of illustration I have indicated that these ammeters are respectively connected with the secondaries of current transformers $F_1$, $F_2$, $F_3$, the primaries of these transformers being connected in the service bus bars in the usual manner.

At $D_1$, $D_2$ and $D_3$ I have indicated the adapters of my invention each permanently attached to and mounted with an ammeter and each adapted upon operation to transfer the connection of the associated ammeter from the service wiring to the test bus bars. The wires which lead from the grounded and the ungrounded terminals of the secondary of the transformer $F_1$ to the adapter $D_1$ may be regarded as the wires I, I of Fig. 6. The wires which lead from the upper side of the adapter $D_1$ to the test bus Q may be regarded as the wires J, J of Fig. 6. The terminals of the ammeters are represented in Fig. 2 at S, S. Reading Fig. 2 in the light of Fig. 6, therefore, it will be seen that when the adapter handle is thrown into the service position the ammeter will be connected to the normal source in the usual manner. When, however, the adapter switch is thrown into the test position, the terminals of the ammeter will be connected in the test bus circuit Q, R, the wires I, I being short-circuited to maintain the continuity of the circuit in which the ammeter is ordinarily included. The short-circuiting of the service connections prior to the removal of the ammeter from the service circuit prevents the disastrous arcing which otherwise would ordinarily ensue.

It will be noted that the source of test current $F_4$, as shown in Fig. 2, is connected with a standardized ammeter $M_4$ and with the test bus bars Q and R. These test bus bars or conductors are permanently fixed in place upon the switchboard, and, as shown, are run to the adapter contacts of each ammeter. Any of the ammeters may therefore be thrown into circuit with the test circuit upon the manipulation of the adapted lever from the face of the switchboard. Furthermore, the connection of the ammeters with the service circuit does not destroy the continuity of the testing circuit because of the connection which is established between the wires J, J, whenever the adapter is thrown into the position for connecting the instrument with the service circuit. The result is that the operator may at any time connect any of the ammeters in the switchboard with the auxiliary testing circuit with which the standardized instruments are permanently connected. This very greatly facilitates the testing of the service instruments and enables the connections which are required for such testing to be made without the least danger to the operator or other person whose duty it is to test and calibrate the service instruments.

Fig. 3 shows the method of installing the adapter of my invention for testing or checking an entire system of meters, either current or pressure actuated, together with permanent interconnecting wiring. This arrangement provides means of quickly checking many different circuits for continuity and insulation, together with a check on the scale indication of the several meters. For the sake of clearness the meter connections are omitted in this figure, but it will be apparent to those skilled in the art that it is not material whether the meters are series or shunt connected.

In Fig. 4 is diagrammatically illustrated the use of my invention in conjunction with voltmeters and the means for testing them. In this diagram the source of test current is shown at $F_4$, the standard voltmeter at $M_4$, the test bus bars at Q and R, the service voltmeters at $M_1$, $M_2$, $M_3$, and the sources of the current with which the instruments are normally connected at $F_1$, $F_2$ and $F_3$. The adapters are shown also at $D_1$, $D_2$ and $D_3$. For use in conjunction with voltmeters the conductors O, the switch blades K, K and the associated contacts will be omitted, because it is unnecessary to connect together the terminals of either the service or testing circuits when the voltmeter is disconnected therefrom. Here, as before, the adapter mechanism when thrown into the service position connects the voltmeter with the service circuit. When the adapter is thrown into the test position the voltmeter will be connected with the test wiring with which the switchboard is permanently provided and which runs to the source of testing current and the instrument or instruments which are used in testing and calibrating the service voltmeters.

My invention may be employed also in testing and calibrating wattmeters, and this adaptation is diagrammatically illustrated in Fig. 5. Here the wattmeters are shown at $W_1$, $W_2$ and $W_3$, each wattmeter being provided, of course, with two circuits, one for a current proportional to the pressure and the other for a current proportional to the rate of flow of the current to be measured. The terminals of the pressure circuit are indicated at $S_1$, $S_1$, the terminals of the current circuit being indicated at $S_2$, $S_2$. The circuit whose wattage is measured by the instrument $W_1$ is indicated at X, the pressure transformer U serving to supply the pressure circuit of the instrument and the current transformer V serving to supply the current circuit. In this modification of my invention two adapters are shown at $D_6$ and $D_7$ respectively. The adapter $D_7$ is provided with the short-circuiting contacts as illustrated in Fig. 6 and serves to transfer the connection of the current coil of the wattmeter from the service circuit to the test bus bars $Q_1$, $R_1$ or vice versa. The adapter $D_6$ is not provided with the short-circuiting contacts and connections and serves when in one position to connect the pressure circuit of the wattmeter with the service circuit and when in the other position to connect this pressure circuit with the testing circuit $Q_2$, $R_2$. At $W_4$ I have shown a standard wattmeter with which the service instruments are compared, the source of testing current being indicated in this case at $F_5$. The wattmeters $W_2$ and $W_3$ are in like manner equipped with a pair of adapters, each pair of adapters being operated by one or two levers, as may be desired. These wattmeters are arranged to measure the energy in service circuits as indicated by the connections on Fig. 5, and may, like the wattmeter $W_1$, be thrown from the service to the testing circuit whenever it is desired to make comparison with the standard instruments. The wattmeters here shown may be either indicating or integrating instruments.

It will be seen that by the use of my invention and suitable modifications thereof it becomes a very simple matter periodically to test or check the accuracy of all of the instruments which may be permanently installed on power station switchboards or on meter or other controlled panels. It will be apparent that various circuits of a switchboard installation may in like manner be equipped with the adapters of my invention whereby the circuits may be tested for continuity and insulation resistance preliminary to putting them into service initially or subsequent to a temporary shutdown. The advantages of my invention when used in this connection are similar to those already pointed out in connection with the testing of the service instruments.

It will be understood that the test circuit may be subdivided into several circuits, each serving to connect a desired group of instruments with the standard instruments and the source of test current, thereby avoiding an excessive number of contact points in any one test bus.

Various modifications of the preferred form of my invention as herein set forth will occur to those skilled in the art, and I do not wish to limit myself to the precise details herein disclosed.

What I claim as new and desire to secure by Letters Patent is:

1. In a switching device, the combination of means for electrically connecting the terminals of one circuit with a measuring instrument, means for connecting the terminals of a second circuit with the same instrument, said first connecting means being ineffective when the second connecting means is effective, and vice versa, an auxiliary contact associated with each terminal of said circuits, and means for electrically connecting the auxiliary terminals of the circuit which is not connected with said measuring instrument.

2. In a switching device, the combination of switch blades for electrically connecting the terminals of an electric circuit, switch blades electrically and mechanically connected with said first switch blades, said second switch blades adapted to form electrical connection with the terminals of a second circuit when said first blades are moved from contact with the terminals of said first circuit, said second blades thereby being disconnected from the terminals of said second circuit when the first blades are connected with the terminals of said first circuit, means for electrically connecting a measuring instrument with said blades, thereby closing through said instrument the circuit with which said blades are connected, an auxiliary contact associated with each terminal of said circuits, switch blades mechanically joined but electrically insulated from said first and second blades, and means electrically connecting together said third blades, said third blades adapted to electrically connect the auxiliary terminals of the circuit in which said measuring instrument is not included.

3. In a switching device, the combination of switch blades for electrically connecting the terminals of an electric circuit, switch blades electrically and mechanically connected with said first switch blades, said second blades adapted to form electrical connection with the terminals of a second circuit when said first blades are moved from contact with the terminals of said first circuit, said second blades thereby being disconnected from the terminals of said second circuit when the first blades are connected with the terminals of said first circuit, means for electrically connecting a measuring instrument with said blades, thereby closing through said instrument the circuit with which said blades are connected, an auxiliary contact associated with each terminal of said circuits, switch blades mechanically joined but electrically insulated from said first and second blades, and means electrically connecting together said third blades, said third blades adapted to electrically connect the auxiliary terminals of the second circuit in which said measuring instrument is not included before connection is broken between the main terminals of the circuit in which the instrument is included and the first or second switch blades.

4. In a switching device, the combination of a pair of switch blades for electrically connecting the terminals of an electric circuit, a second pair of switch blades electrically and mechanically connected with said first switch blades, said second pair of blades adapted to form electrical connection with the terminals of a second circuit when the first pair of blades is removed from contact with the terminals of said first circuit, said first pair of blades adapted to electrically connect the terminals of said first circuit when said second pair of blades is removed from contact with the terminals of said second circuit, an insulating handle mechanically connecting the blades of said pairs, means for electrically connecting a measuring instrument with said blades, thereby closing through said instrument the circuit with which said blades are in contact, an auxiliary contact associated with each terminal of said circuits, a third pair of switch blades mechanically joined but electrically insulated from said first and second pair of blades, and means electrically connecting together said third pair of blades, said third blades adapted to electrically connect the auxiliary terminals of the circuit in which said measuring instrument is not included.

5. In a switching device, the combination of a pair of switch blades for electrically connecting the terminals of an electric circuit, a second pair of switch blades electrically and mechanically connected with said first switch blades, said second pair of blades adapted to form electrical connection with the terminals of a second circuit when the first pair of blades is removed from contact with the terminals of said first circuit, said first pair of blades adapted to electrically connect the terminals of said first circuit when said second pair of blades is removed from contact with the terminals of said second circuit, an insulating handle mechanically connecting the blades of said pairs, means for electrically connecting a measuring instrument with said blades, thereby closing through said instrument the circuit with which said blades are in contact, an auxiliary contact associated with each terminal of said circuits, a third pair of switch blades mechanically joined but electrically insulated from said first and second pair of blades, and means electrically connecting together said third pair of blades, said third blades adapted to electrically connect the auxiliary terminals of the circuit in which said measuring instrument is not included before connection is broken between the main terminals of the circuit in which the instrument is included and the pair of switch blades electrically connected therewith.

6. A test switch for recording wattmeters comprising an insulated base, permanent conducting blocks thereon normally in the path of the working circuit, conducting blocks adjoining same normally not within the circuit, movable parts mounted on the base provided with insulated blocks adapted to slide on the permanent blocks changing thereby the circuit recording the customer's load into a non-recording position for testing without interrupting the customer's service.

In witness whereof, I hereunto subscribe my name this 8th day of February, A. D. 1908.

BERTRAND G. JAMIESON.

Witnesses:
LYNN A. WILLIAMS,
C. A. KELLER.

---

Copies of this patent may be obtained for five cents each, by addressing the "Commissioner of Patents, Washington, D. C."